United States Patent [19]
Allen

[11] Patent Number: 5,587,115
[45] Date of Patent: Dec. 24, 1996

[54] METHOD OF MANUFACTURING A CONDUIT ASSEMBLY WITH A FLOATING DIVIDER

[75] Inventor: Jerry L. Allen, Westfield Ctr., Ohio

[73] Assignee: Vikimatic Sales, Inc., Wadsworth, Ohio

[21] Appl. No.: 446,563

[22] Filed: May 19, 1995

Related U.S. Application Data

[62] Division of Ser. No. 215,595, Mar. 22, 1994, abandoned.

[51] Int. Cl.⁶ .................................................. B29C 47/02
[52] U.S. Cl. .......................... 264/1.24; 156/244.12; 156/244.13; 264/1.28; 264/1.29; 264/171.13; 264/171.26; 264/209.3; 425/113
[58] Field of Search ................. 264/171.13, 171.26, 264/209.3, 150, 1.24, 1.28; 156/51, 244.12–244.14; 425/113, 467

[56] References Cited

U.S. PATENT DOCUMENTS

| | | | |
|---|---|---|---|
| 228,947 | 6/1880 | Seaman | 138/177 |
| 1,856,109 | 5/1932 | Murray | 174/99 R |
| 2,440,668 | 4/1948 | Tarbox | 138/108 |
| 3,313,921 | 4/1967 | Mohn et al. | 174/99 R |
| 3,363,879 | 1/1968 | Irik | 254/134.3 FT |
| 3,456,064 | 7/1969 | Toto | 174/99 R |
| 4,191,518 | 3/1980 | Kojimoto et al. | 425/467 |
| 4,236,953 | 12/1980 | Takahashi | 264/171.26 |
| 4,443,277 | 4/1984 | Rokas | 156/51 |
| 4,568,507 | 2/1986 | Baxter | 264/1.29 |
| 4,602,763 | 7/1986 | Gaylin | 254/134.3 FT |
| 4,716,001 | 12/1987 | Kottke | 264/150 |
| 4,793,594 | 12/1988 | Kumpf | 254/134.3 FT |
| 4,822,134 | 4/1989 | Campbell | 254/134.3 FT |
| 4,836,968 | 6/1989 | Cakmakci | 264/209.3 |
| 4,892,442 | 1/1990 | Shoffner | 264/171.27 |
| 4,985,185 | 1/1991 | Mayr et al. | 264/1.29 |
| 5,029,815 | 7/1991 | Kumpf | 254/134.3 FT |
| 5,074,527 | 12/1991 | Kumpf | 254/134.3 FT |
| 5,238,225 | 8/1993 | Hunt | 254/134.3 FT |
| 5,442,136 | 8/1995 | Allen | 174/95 |

FOREIGN PATENT DOCUMENTS

| | | | |
|---|---|---|---|
| 1196738 | 7/1965 | Germany | 174/99 |
| 4292 | 4/1977 | Japan | 174/99 R |
| 487578 | 6/1938 | United Kingdom | 174/28 |
| 2172544 | 9/1986 | United Kingdom | 264/1.29 |

OTHER PUBLICATIONS

"Vikimatic OCCU–DUCT an Inner Duct System", advertising brochure, Vikimatic sales, Inc., P.O. Box 629, Wadsworth, Ohio 44281; 1988.

"FODUCT", 8 page brochure, Aeroquip Corporation, Maumee, Ohio 43537; 1991.

*Primary Examiner*—Jeffery R. Thurlow
*Attorney, Agent, or Firm*—Renner, Kenner, Greive, Bobak, Taylor & Weber

[57] ABSTRACT

A conduit assembly (10) is manufactured by extruding a casing (11) through a die while at the same time feeding a web member (15) into the casing (11) as it is being extruded to form a plurality of chambers (16, 17). If the conduit assembly (10) is manufactured with a line, such as a rope (18) or a cable (19), the rope (18) and/or cable (19) is likewise fed into the casing (11) adjacent to the web member (15) into one or both of the chambers (16, 17).

8 Claims, 3 Drawing Sheets

METHOD OF MANUFACTURING A CONDUIT ASSEMBLY WITH A FLOATING DIVIDER

This application is a division of application Ser. No. 08/215,595, filed Mar. 22, 1994 now abandoned.

TECHNICAL FIELD

This invention relates to a conduit assembly including a tubular casing of the type that might be employed to carry cables, such as fiber optic cables, underground. More particularly, this invention relates to such a conduit assembly which is manufactured with a free-floating partitioning device therein to divide the casing into two separate chambers so that more than one cable may be placed in the casing without interference from another cable which might be in the casing.

BACKGROUND ART

Modern communication technology utilizes cables, such as fiber optic cables, most often positioned in a conduit or casing which is buried underground. The installation of such an underground cabling network is a tedious and expensive project. First, usually a trench must be dug and then the conduit or casing, typically of two to four inches in diameter and oftentimes extending for miles in length, is positioned in the trench. The communications cable is then installed in the casing, either by pulling or pushing the same therethrough. The trench is then filled and the communications network is ready to be utilized, being housed in the casing safe from the environment of water, gnawing animals and the like.

One of the problems with these systems is that a casing can usually only carry one cable which is positioned therein in a random, sinuous path thereby essentially prohibiting another cable from being readily installed in the existing casing. Thus, if at a later date the communications system needs to be expanded, as by the addition of another cable, the entire installation process needs to be repeated—at a redundant expense.

One solution to the problem, which has been suggested, is to introduce a strip of material into the existing casing which effectively pushes the existing cable to one side in the casing thereby creating a second chamber in the casing for the unobstructed installation of a second cable. Such a procedure, however, first requires the separate manufacture of the strip material, and then requires the separate installation thereof in the field in the existing underground casing. Moreover, this installation in and of itself can be quite tedious and time consuming inasmuch as first a rope must be blown or otherwise introduced into the casing along its entire length. Then the strip is attached to the rope and pulled with sufficient force to move the existing cable aside and navigate all of the bends and turns normally encountered in the network—while at the same time taking care that the existing cable is not damaged. Finally, a new cable must then be positioned in the casing to complete the project.

It has also been proposed to extrude a casing, which is typically formed of a polyvinylchloride material, with a diametric bar extending thereacross to permanently divide the casing into two semicircular halves. However, such complicates the manufacturing process necessitating the development of special temperature parameters so that the casing cools at the same rate as the bar extending across the inside of the casing. Even when such care in manufacturing is taken to the best extent practical, often the bar will shrink faster causing the casing to take on an undesirable elliptical shape. Finally, while this permanently divided casing does solve some of the problems of the prior art, when a cable is being installed in this casing, movement of the cable is often impeded as it engages the permanent junction of the bar and the inside of the casing. That is, the cable will tend to get stuck on these junctions, especially when many turns are encountered, which not only impedes the facile installation of the cable, but can also tend to damage or abrade the cable making it unsuitable for its intended use.

Thus, the need still exists for an economically manufactured divided cable conduit assembly into which more than one cable can be readily and efficiently installed without the likelihood of damage thereto.

DISCLOSURE OF THE INVENTION

It is thus a primary object of the present invention to vastly simplify the procedures required to install underground cable systems.

It is another object of the present invention to provide a conduit assembly which can carry multiple cables without the need to separately divide the casing into multiple chambers.

It is a further object of the present invention to provide a conduit assembly, as above, which will not damage the cable as it is being installed.

It is an additional object of the present invention to provide a conduit assembly, as above, which can be adapted so that there is no need to blow a rope into the casing in the field prior to the insertion of a cable.

It is yet another object of the present invention to provide a method of manufacturing the conduit assembly so that a free-floating casing-dividing web is positioned within the casing as the casing is being extruded.

These and other objects of the present invention as well as the advantages thereof over existing prior art forms, which will become apparent from the description to follow, are accomplished by the improvements hereinafter described and claimed.

In general, a conduit assembly made in accordance with the present invention includes a longitudinally extending tubular casing having a wall thickness defining the exterior diameter of an outer wall and the interior diameter of an inner wall. The casing is manufactured with a longitudinally extending web member therein. The web member has a lateral dimension slightly less than the internal diameter of the casing and divides the casing into two chambers so that a line may be positioned in either or both of the chambers without passing between a lateral edge of the web member and the inner wall of the casing.

The conduit assembly is manufactured by extruding the casing while at the same time feeding the web member into the casing as it is being extruded.

A preferred exemplary conduit assembly and its method of manufacture, incorporating the concepts of the present invention, are shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
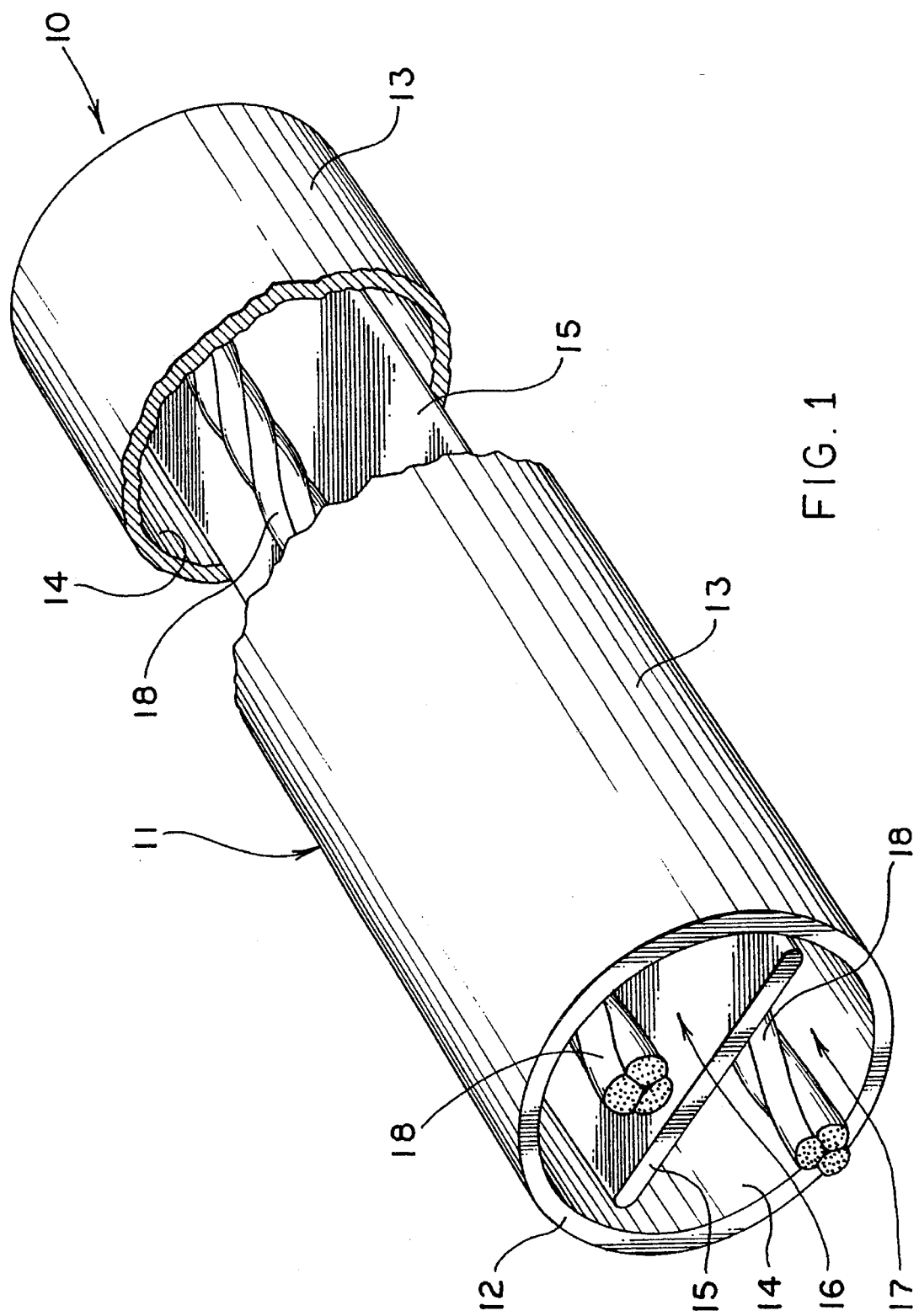
FIG. 1 is a fragmented perspective view of a conduit assembly made in accordance with the concepts of the present invention.

A conduit assembly made in accordance with the present invention is indicated generally by the numeral 10 and includes an outer longitudinally extending casing or conduit generally indicated by the numeral 11. Casing 11 is preferably made of a polyethylene material and is extruded to a desired length, oftentimes as much as thousands of feet in length. As such, after manufacture it is usually coiled on a large drum for transport to the field where it will ultimately be buried underground and house one or more lines, such as fiber optic transmission cables. Casing 11 is tubular in nature having a wall thickness 12 which defines the exterior diameter of an outer wall 13 and the interior diameter of an inner wall 14.

Casing 11 is manufactured with a longitudinally extending, preferably flat, free-floating web member 15 positioned therein. Web member 15, which may also be manufactured of a polyethylene material, divides casing 11 into two internal chambers 16 and 17. As shown, web member 15 has a lateral dimension slightly less than the internal diameter of casing 11. While the exact lateral dimension of web member 15 is not critical to the present invention, it is important that the difference between its lateral dimension and the internal diameter of casing 11 be such that a line inserted in casing 11, for example, a rope 18 or a fiber optic or other transmission cable 19, cannot pass between the lateral edges of web member 15 and the inner wall 14 of casing 11. Thus, in applications where very small lines are to be positioned in casing 11, the lateral dimension of web member 15 is such as to be only slightly less than the diameter of inner wall 14. Of course, if larger lines are to be installed, the gap between web member 15 and inner wall 14 can be greater with it only being important that a line cannot pass from chamber 16 to chamber 17 or otherwise be damaged by or caught in the gap.

Casing 11 may also be manufactured with a line or lines positioned in either or both chambers 16 and 17, in a manner to be hereinafter described. For example, as shown in FIG. 1, a rope 18 is positioned in both chambers 16, 17. If at the time of manufacture it is known exactly what type of transmission cable is to be ultimately positioned in casing 11, it may be positioned in one or both chambers 16, 17 of casing 11 during the manufacturing process instead of a rope 18.

Figure 2:
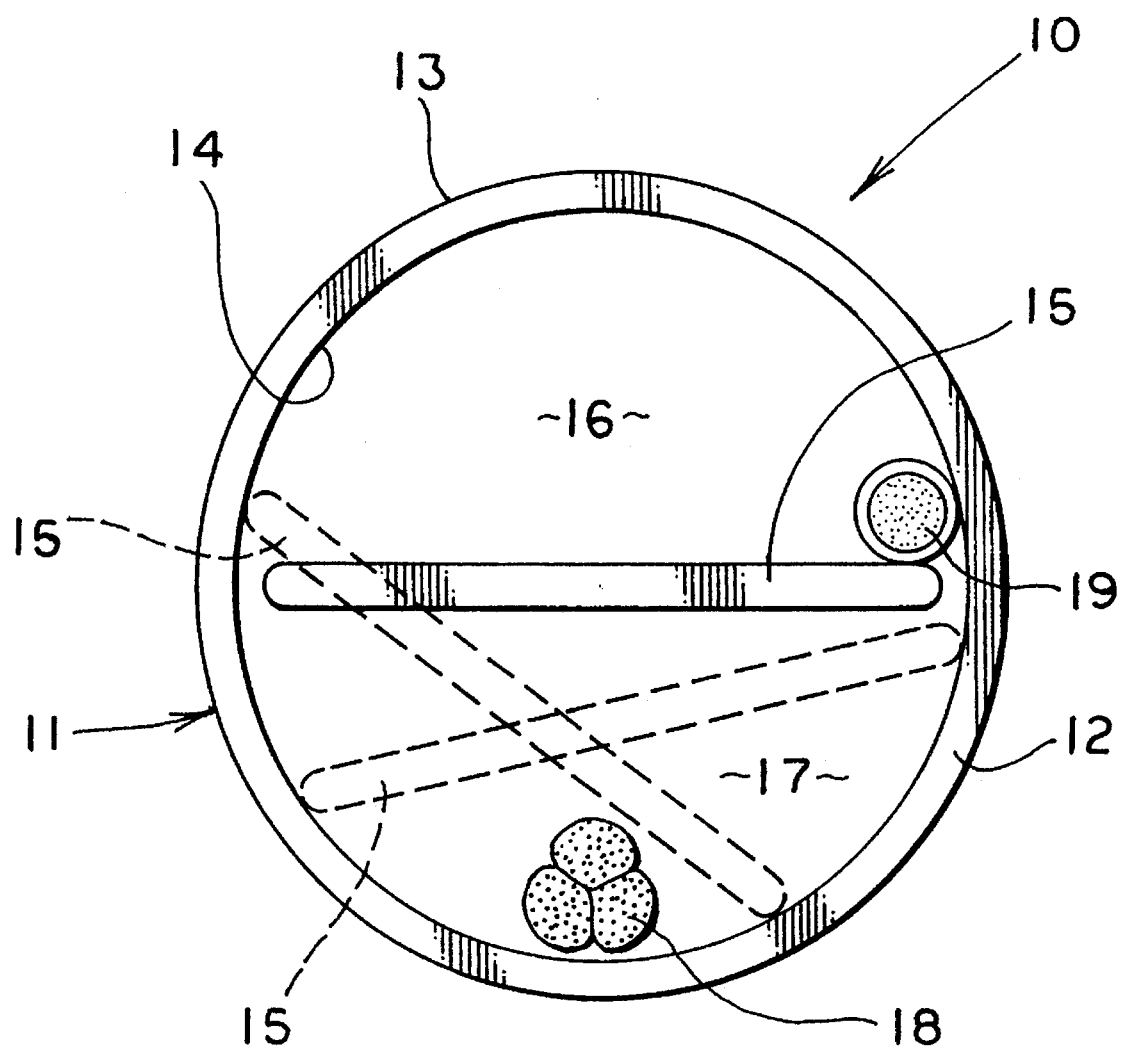
FIG. 2 is an end view of the conduit assembly shown in FIG. 1.

As has been previously described herein, the purpose of rope 18 is to provide a vehicle by which a cable 19 may be inserted into casing 11 in the field. Thus, the casing 11 shown in FIG. 1 is transferred to the field installation site and is buried in the ground. A cable 19 is then attached to one end of one of the ropes 18 and is pulled into chamber 16 or 17 of casing 11, for example, chamber 16 as shown in FIG. 2. As also shown in FIG. 2, as cable 19 is being inserted in chamber 16, because of its free-floating nature, web member 15 can oscillate about in casing 11, as shown by the dotted lines, which is convenient for the facile installation of a cable because when in the ground, casing 11 will embark through many turns, bends or the like. The presence of web member 15 therefore does not at all impede the installation of the cable. It should be noted that as previously described, web member 15 at all times maintains cable 19 in chamber 16 and a rope 18 in chamber 17 if, in fact, casing 11 has been manufactured with a rope 18 in both chambers. If at any time it is desired to position a second cable 19 in casing 11, the remaining rope 18 in chamber 17 presents an in-place vehicle for such installation. It should also be noted that a casing 11 may be manufactured without ropes 18 in chambers 16 and 17 should it be the preference of the cable installer to blow a rope into a chamber 16 or 17 at the installation site in the conventional manner.

Figure 3:
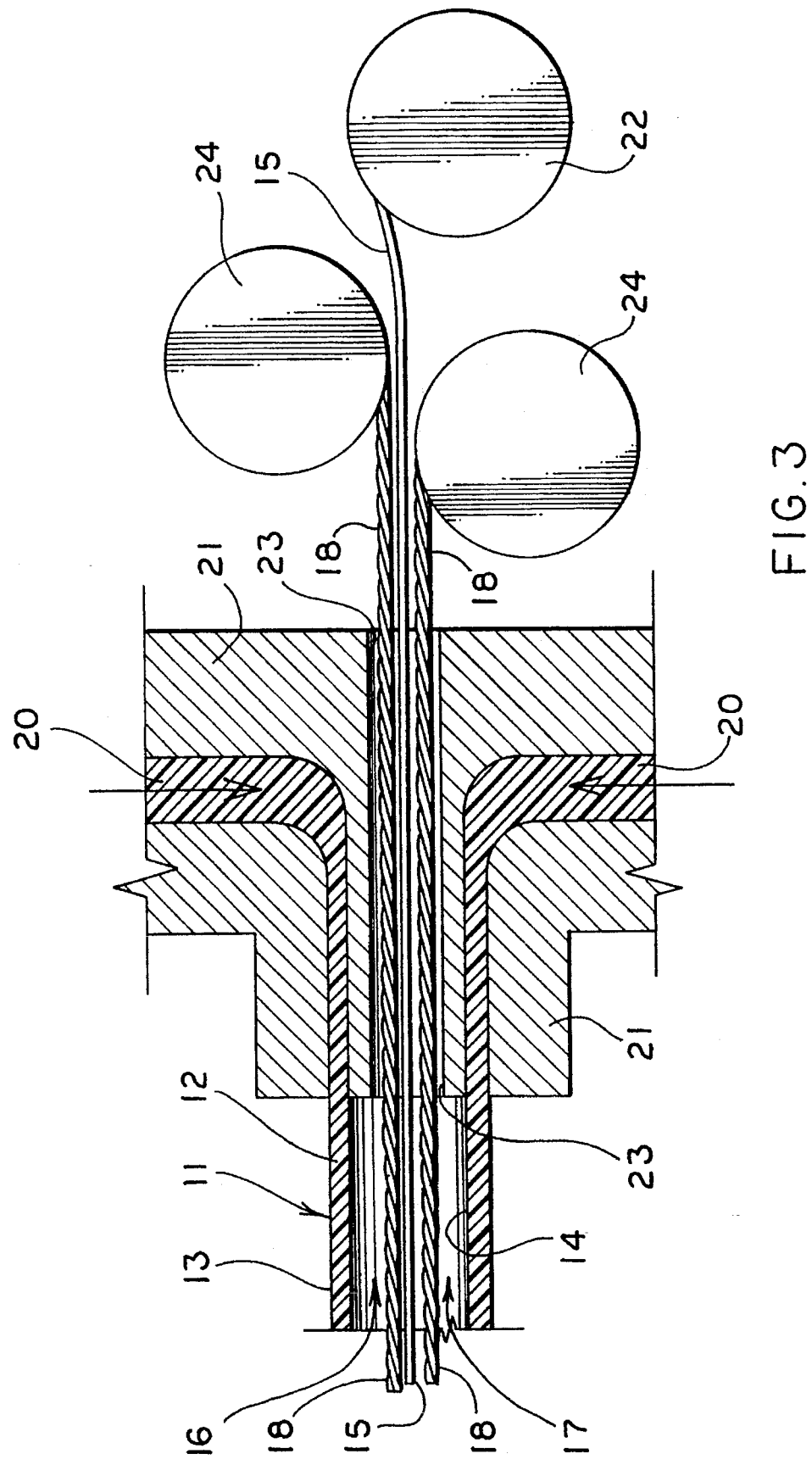
FIG. 3 is a somewhat schematic view depicting the manner in which the conduit assembly of FIG. 1 is manufactured.

One manner in which conduit assembly 10 can be manufactured in accordance with the concepts of the present invention is schematically shown in FIG. 3. As shown, casing 11 is formed from the input plastic material 20 received in an extrusion die 21 in the conventional plastic extrusion process. A supply of web member 15 can be provided on a coil 22 positioned adjacent to die 21 and the web member 15 can thereby be fed through an opening 23 in die 21 to the interior of casing 11 as it is being formed. As such, web member 15 is payed off of coil 22 at the same speed as casing 11 is being extruded. Similarly, if it is desired to provide conduit assembly 10 with a line, such as a rope 18 or a cable 19 in one or both of its chambers 16 and 17, coils 24 of rope 18, for example, can likewise be positioned adjacent to die 21 and feed rope 18 through die opening 23 with web member 15 into casing 11 at the same speed that casing 11 is being extruded. The extruded conduit assembly 10 may then be coiled for shipment to the installation site.

It should, of course, be appreciated that web members of differing configuration could be utilized to divide casing 11 into any number of chambers without departing from the concept of the present invention. For example, an x-shaped web member would effectively divide casing 11 into four chambers.

In view of the foregoing, it should be evident that a conduit assembly 10, manufactured and utilized as described herein, accomplishes the objects of the present invention and otherwise substantially improves the art.

I claim:

1. A method of manufacturing a conduit assembly comprising the steps of extruding a longitudinally extending tubular casing through a die, and at the same time feeding a longitudinally extending web member into the casing without contacting the casing as it is being extruded.

2. A method according to claim 1 wherein the step of extruding and the step of feeding are done at the same speed.

3. A method according to claim 1 further comprising the step of first positioning a supply of the web member adjacent to the die.

4. A method according to claim 3 wherein the step of feeding is accomplished by passing the web member from the supply through the die.

5. A method according to claim 1 further comprising the step of feeding at least one longitudinally extending line into the casing adjacent to the web member wherein the web member and the casing form a plurality of chambers therebetween for receiving the line.

6. A method according to claim 5 wherein the step of extruding and the steps of feeding are done at the same speed.

7. A method according to claim 5 further comprising the step of first positioning a supply of the web member and a supply of the line adjacent to the die.

8. A method according to claim 6 wherein the steps of feeding are accomplished by passing the web member from the supply and the line from the supply through the die.

* * * * *